United States Patent Office 2,737,458
Patented Mar. 6, 1956

2,737,458
WATER REPELLENT COMPOSITION

Robert R. Burnham, Eggertsville, N. Y., assignor to Union Carbide and Carbon Corporation, a corporation of New York No Drawing. Application May 15, 1952, Serial No. 288,057

17 Claims. (Cl. 106—171)

This invention relates to compositions for use in treating fibrous materials to impart water repellency, and more particularly to water miscible compositions which can be mixed or diluted with water to form a bath, in which the fibrous materials are treated for rendering the same water repellent.

Such treatment may follow laundering to render the material water repellent between launderings. Certain or all of the ingredients may wash out in the laundering, depending upon the detergent employed, so that the compositions and the treatment may be designated as non-durable, semi-permanent, or laundry removable. However, such treatment may be applied in the mill for rain wear, curtains, draperies, table linens, paper, leather, glass, wood, etc. and the water repellency may be incidental to other desired qualities.

Heretofore non-durable water repellent formulations have generally been sold and stored as emulsions containing relatively large proportions of water. The weight and volume of the water, as much as 75% of the composition, increases the charges for shipping the composition, and the size of the container, and the chemical effect of the water increases the cost of packing and storage, by requiring corrosion resistant and liquid tight containers. Furthermore, storage and shipping involve an emulsion stability problem to prevent the emulsion from breaking into layers or precipitating and agglomerating into non-homogeneous masses. Severe temperature changes are particularly destructive of emulsions.

Attempts have been made to reduce the quantity of water in such formulations, and to provide compositions which could be shipped as a dry powder, to be made into an emulsion by the user. These attempts have not been successful, mainly because the preparation of the emulsion has required the user to employ special equipment such as colloid mills with attendant capital investment and cost of maintenance and operation.

Furthermore, the compositions have been unstable, and suffered from drying out over prolonged storage periods, especially when exposed to conditions of low humidity. Excessive dehydration results in a difficultly soluble material with attendant malfunctioning of the emulsion bath.

Another difficulty is that the degree of water repellency has been lowered, largely due to the large proportion of emulsifier heretofore thought to be necessary. The treated fabric subjected to spray tended to wet when contacted on its under side by an object, this tendency increasing when the contacting object was moved about. This phenomenon was called contact wetting or penetration.

Objects of the present invention are to avoid the difficulties referred to above, and to provide a water repellent composition which has emulsion stability, which can be prepared, stored and shipped as a dry solid without drying out, and diluted for use without difficult manipulations or special equipment, which has a low proportion of emulsifier, which produces a high degree of water repellency resistant to contact penetration, and is otherwise well adapted for the purposes set forth.

The dry solid is not necessarily anhydrous, because moisture is generally present, but the composition is of definitely solid, preferably pulverant form, as powder, flakes, shreds, granules, etc.

According to the present invention the ingredients comprise essentially active water repellents, emulsifiers, a bonding and insolubilizing agent, and a hygroscopic or humectant agent.

The ingredients designated broadly as essentially active water repellents are: wax, preferably paraffin; a fixative comprising a water soluble dissociable salt of an acid of the group consisting of lower fatty acids containing 2 to 4 carbon atoms, ammonium substituted carbonic acid and hydrochloric acid, and having a metallic radical of the group consisting of aluminum and zirconyl, preferably stabilized water soluble aluminum acetate; and an oil soluble aluminum or zirconium salt of a long chain fatty acid containing 10 to 18 carbon atoms, preferably aluminum distearate.

The emulsifiers are: a water in oil emulsifier consisting of a sorbitol ester of a higher fatty acid containing 16 to 18 carbon atoms, preferably sorbitan oleate; an oil in water emulsifier consisting of a sorbitol ester-ether combination of a higher fatty acid containing 16 to 18 carbon atoms, preferably polyoxyethylene sorbitan oleate; and a water in oil emulsifier comprising an oil soluble aluminum or zirconium salt of a long chain fatty acid containing 10 to 18 carbon atoms, preferably aluminum distearate.

It should be noted that the same oil soluble aluminum or zirconium salt of a long chain fatty acid containing 10 to 18 carbon atoms, preferably aluminum distearate, is listed once as a water repellent, and again as an emulsifier, because it has both functions. This ingredient is an essential component for superior water repellency and bath stability, and allows reduction of some 50% of the ester ether combinations of sorbitol while at the same time preserving good emulsification qualities. This reduction in emulsifier content results in superior water repellency.

The bonding and insolubilizing agent increases the resistance to contact wetting or penetration, and comprises polyvinyl alcohol or hydroxy ethyl cellulose.

The hygroscopic or humectant agent comprises an organic polyol compound having from 2 to 6 hydroxyl groups, for example, sorbitol, glycerol, ethylene glycol, propylene glycol, diethylene glycol, dipropylene glycol and solid polyethylene glycols having molecular weights from 1000 to 6000.

The waxes employed are: vegetable waxes such as carnauba, Japan, candelilla, palm and ouricuri; insect waxes such as beeswax, petroleum waxes such as paraffin, microcrystalline and caresin waxes; synthetic waxes such as Acrowax, Armorwax, chlorinated naphthalene, synthetic paraffins, and opal wax. Blends of these waxes are also desirable.

For example, carnauba wax blended with paraffin wax raises the melting point of paraffin considerably and in some cases gives results similar to pure carnauba. In this case carnauba wax enhances the physical properties of the solid preparation by raising its melting point, thus making it easier for processing while at the same time resulting in superior water repellency. Also small percentages of various other of the above waxes give definite qualities to paraffin which may be used to obtain a desired textile finish.

The economically preferred wax is paraffin with a melting point between just above room temperature to laundering temperatures, say 85° C. Paraffin wax melting in the range from 51° to 53° C. is preferred because it is economical, easily formulated, and gives a particularly good hand to treated fabric. The proportion of wax may be 35 to 65 parts by weight, the higher percentage being preferred for economy.

The dissociable metal salt employed as a fixative is preferably a water soluble basic aluminum acetate. While pure basic aluminum acetate is insoluble in water, mixed aluminum salts of acetic and other acids show a considerable degree of solubility, and by incorporaitng a sufficient amount from 10 to 15% of boric acid or about 30% of formic acid the aluminum salt is made soluble in water and as such may be used in this particular type of formulation. Other compounds may be used instead of the aluminum acetate, such as zirconyl acetate, zirconyl ammonium carbonate, zirconyl oxychloride, aluminum formate, metal propionates and metallic butyrates. The proportion of dissociable metal salts is 5 to 20% by weight.

Sorbitan oleate and polyoxyethylene sorbitan oleate are both classed as non-ionic emulsifiers, having what is termed in emulsion language a "high calcium tolerance," not being susceptible to precipitation by the alkaline earth and poly valent elements as are the anionic emulsifiers commonly used such as sodium or potassium oleate. The cationic variety of emulsifiers, such as octadecylamine acetate or hydrochloride are not satisfactory inasmuch as they are also powerful wetting agents and as such counteract the water repellent effect desired. However, other esters and ester ether combinations may be used such as sorbitan stearate, and sorbitan palmitate with their respective ethers. We have obtained best results when the two emulsifiers are used in about equal proportions, with a slight preference for a slight excess of the ester-ether combination. It must be emphasized, however, that slight variations in results may be attributable to the specific equipment employed during the formulation or emulsification process.

A very considerable improvement in contact penetration was achieved through the incorporation of a resinous material (i. e.) polyvinyl alcohol, preferably from 86 to 98% hydrolyzed, into the water repellent formulation. The polyvinyl alcohol picked up by the fabric during the immersion period is insolubilized during the curing or drying period. As an illustration of the efficiency of polyvinyl alcohol for this purpose, the contact penetration resistance was increased from 2 minutes to over 24 hours when evaluated in a standardized test procedure, this notwithstanding the fact that little or no change occurred in the air permeability of the treated material. Thus in this composition polyvinyl alcohol functions as a bonding as well as an insolubilizing agent.

Incidental to these effects, other advantages occurring from the use of polyvinyl alcohol are increased water repellency and superior emulsion bath stability. It has also been found possible to substitute hydroxy ethyl cellulose in whole or in part for the polyvinyl alcohol with resulting similar effects. Preferably a dispersion agent is added; for example, sodium lauryl sulfate, to prevent any agglomeration of the resinous material.

An oil phase diluent for the wax may optionally be used with resulting improvements in the emulsion bath stability. Such materials as benzene, toluene, xylene, stoddard solvent, naphtha of mineral spirits, paraffin oil and turpentine have been successfully incorporated into the composition.

As a result of employing a hygroscopic or humectant material it has been found possible to expose the composition when in a finely divided state to varying conditions of relative humidity over prolonged storage periods (6 to 12 months) with no resulting deleterious effects.

The preferred embodiment of the composition is as follows:

| Components | Percent by Weight | Percent Limits |
| --- | --- | --- |
| Paraffin wax | 35.00 | 35-60 |
| Carnauba wax | 0.25 | 0-5 |
| Aluminum distearate | 0.25 | 0.1-1.5 |
| Mineral Spirits | 3.50 | 2-5 |
| Sorbitan Oleate | 4.75 | 3-6 |
| Polyoxyethylene Sorbitan Oleate | 4.75 | 3-6 |
| Water | 20.65 | 20-35 |
| Polyvinyl alcohol | 1.85 | 1-5 |
| Water soluble aluminum acetate $Al_2O_3=37\%$ | 18.50 | 5-20 |
| Sorbitol | 10.00 | 5-15 |
| Sodium lauryl sulfate | 0.50 | 0.1-2 |

Effect of varying concentrations within the prescribed limits over the preferred formula as listed.

| Change | Effect |
| --- | --- |
| 1. Paraffin Increase | Decrease stability of emulsion bath. |
| Paraffin Decrease | Water repellency adversely affected. |
| 2. Carnauba Increase | Decrease stability of emulsion bath. |
| Carnauba Decrease | Water repellency diminished, solid material becomes soft and difficult to process. |
| 3. Aluminum Distearate Increase | Decreases solubility of composition. |
| Aluminum Distearate Decrease | Water repellency diminished and emulsification difficulties encountered in preparation of composition. |
| 4. Sorbitan Oleate Increase | Diminishes water repellency and induces wetting. |
| Sorbitan Oleate Decrease | Bath emulsion adversely affected resulting in instability and large emulsion particle size. |
| 5. Polyoxyethylene sorbitan Oleate Increase. | Diminishes water repellency. |
| Polyoxyethylene sorbitan Oleate Decrease. | Bath emulsion adversely affected resulting in instability and large emulsion particle size. |
| 6. Water Increase | Solid composition becomes soft, and difficult to process. |
| Water Decrease | Emulsification difficulties, water repelling adversely affected. |
| 7. Naphtha Increase | Water repellency adversely affected. Present difficulties in emulsification. |
| Naphtha Decrease | Emulsification and dilution difficulties of the solid composition. |
| 8. Polyvinyl Alcohol Increase | Difficulties in emulsification with resultant precipitation of insolubles. |
| Polyvinyl Alcohol Decrease | Contact penetration increased resulting in inferior water repellency. |
| 9. Aluminum Acetate Increase | Difficulties in emulsification caused thru a salting out effect. Increases cost of product with no apparent beneficial results. |
| Aluminum Acetate Decrease | Water repellency adversely affected, poor stability. |
| 10. Sorbitol Increase | Increases cost of product with no apparent advantageous effect. Materially softens product resulting in processing difficulties. |
| Sorbitol Decrease | Results in a drying out of product with attendant emulsification difficulties. |

A procedure will be recited as a specific example for the preparation of this solid water repellent composition.

1. A melt at 85° C. is made of the following components, paraffin wax 35 parts, carnauba wax 0.25 part, aluminum distearate 0.25 part, naphtha or paraffin oil 3.50 parts, sorbitan oleate 4.75 parts, polyoxyethylene sorbitan oleate 4.75 parts.

2. Polyvinyl alcohol 1.85 parts, 86%–98% hydrolyzed high viscosity is dissolved in cold water 20.65 parts, at 10°–15° C. while stirring rapidly to which is added 10.00 parts of sorbitol, and preferably, 0.5 part of sodium lauryl sulfate. This dispersion is warmed to 40° C., and added slowly to the above (1) oil phase accompanied by vigorous agitation while maintaining the temperature between 75° and 85° C.

3. After a period of 5 minutes with the agitation being continued, 18.50 parts of aluminum acetate powder is added slowly, after the final addition of which the composition is stirred for an additional five minutes followed by the removal of the heat source. When the temperature falls to about 60°–65° C. the composition is solidified by a quick chilling process. After solidification the composition may be flaked, shredded, chipped, extruded or put in any appropriate marketable form.

For use the solid water repellent is diluted to a strength of 1% to 3% with hot water 65°–85° C. As an illustration the solid water repellent composition is emulsified in about 20–25 times its weight with hot water (i. e.) 70° C. and stirred until emulsification is complete, after which it may be diluted with warm or cold water to volume for use. The materials to be made water repellent are immersed for a matter of seconds, 30 seconds being sufficient immersion time to give spray rating equivalent to 100 AATCC. The materials to be made water repellent are extracted to about 50%–80% wet pick up and dried in any conventional manner such as by ironing or tumbling.

I claim:

1. A solid composition of matter capable of being self-emulsified in hot water to form a water repellent bath, comprising from 35 to 65% by weight of a water repellent agent consisting of wax; from 5% to 20% by weight of a fixative comprising a water soluble dissociable salt of an acid of the group consisting of lower fatty acids containing 2 to 4 carbon atoms having a metal radical of the group consisting of aluminum and zirconium; from 3 to 6% by weight of a water in oil emulsifier consisting of a sorbitol ester of a higher fatty acid containing 16 to 18 carbon atoms; from 3% to 6% by weight of an oil in water emulsifier consisting of a polyoxyethylene sorbitol ether which has been esterified by a higher fatty acid containing 16 to 18 carbon atoms; from 0.1 to 1.5% by weight of an agent functioning both as a water repellent and a water in oil emulsifier and consisting of a poly valent salt of a long chain fatty acid containing 10 to 18 carbon atoms, the metal of said salt being selected from the group consisting of aluminum and zirconium; from 1 to 5% by weight of an insolubilizing and bonding agent of the group consisting of polyvinyl alcohol and hydroxy ethyl cellulose; and from 5 to 15% by weight of a hydroscopic material which functions as a humectant preventing dehydration of the solid composition of matter and consisting of an organic polyol compound having from 2 to 6 hydroxyl groups and free from other reactive groups.

2. A solid composition of matter as claimed in claim 1, in which the dissociable salt is an aluminum salt which has been solubilized by the presence of from 10–15% boric acid.

3. A solid composition of matter as claimed in claim 1, in which the dissociable salt is a zirconium salt of acetic acid.

4. A solid composition of matter as claimed in claim 1, in which the dissociable salt is an aluminum salt of formic acid.

5. A solid composition of matter as claimed in claim 1, in which the dissociable salt is zirconyl oxychloride.

6. A solid composition of matter as claimed in claim 1, in which the dissociable salt is zirconyl ammonium carbonate.

7. A solid composition of matter as claimed in claim 1, in which the bonding agent is hydroxy ethyl cellulose.

8. A solid composition of matter as claimed in claim 1, in which the dissociable metal salt is aluminum acetate stabilized by the presence of an acid of the group consisting of from 10 to 15% by weight boric acid and about 30% formic acid.

9. A solid composition of matter as claimed in claim 1, in which the bonding agent is from 86 to 98% hydrolyzed polyvinyl alcohol.

10. A solid composition of matter as claimed in claim 1, in which carnauba wax constitutes up to 5% by weight of the total composition.

11. A solid composition of matter as claimed in claim 1, in which the water in oil emulsier is sorbitan oleate.

12. A solid composition of matter as claimed in claim 1, in which the oil in water emulsifier is polyoxyethylene sorbitol oleate.

13. A solid composition of matter as claimed in claim 1, in which the agent functioning as both a water repellent and a water in oil emulsifier is aluminum distearate.

14. A solid composition of matter as claimed in claim 1, in which the humectant agent is sorbitol.

15. A solid composition of matter as claimed in claim 1, in which the humectant agent is a glycol.

16. A solid composition of matter capable of being self-emulsified in hot water to form a water repellent bath, comprising 35 to 65% by weight of a water repellent agent consisting of wax; 5 to 20% by weight of a fixative consisting of water soluble aluminum acetate; 3 to 6% of a water in oil emulsifier consisting of an oleic acid ester of sorbitol; 3 to 6% by weight of an oil in water emulsifier consisting of a polyoxyethylene sorbitol ether which has been esterified by oleic acid; 0.1 to 1.5% of an agent functioning both as a water repellent and a water in oil emulsifier and consisting of a poly valent salt of a long chain fatty acid containing 10 to 18 carbon atoms, the metal of said salt being selected from the group consisting of aluminum and zirconium; 1 to 5% by weight of an insolubilizing and bonding agent selected from the group consisting of polyvinyl alcohol and hydroxy ethyl cellulose, and 5 to 15% by weight of a hygroscopic material which functions as a humectant preventing dehydration of the solid composition and selected from the group consisting of sorbitol, glycerol, and polyethylene glycols.

17. A solid composition of matter capable of being self-emulsified in hot water to form a water repellent bath, comprising from 35% to 65% by weight of a wax from 2 to 5% of an oil phase diluent for the wax; from 5% to 20% of a fixative comprising a water soluble dissociable salt of a lower fatty acid containing 2 to 4 carbon atoms and having a metal radical of the group consisting of aluminum and zirconium; from 3% to 6% by weight of a water in oil emulsier consisting of a sorbitol ester of a higher fatty acid containing from 16 to 18 carbon atoms and from 3% to 6% of an oil in water emulsifier consisting of a polyoxyethylene sorbitol ether which has been esterified by a higher atty acid containing from 16 to 18 carbon atoms; from 0.1% to 1.5% by weight of an agent functioning both as a water repellent and a water in oil emulsifier and consisting of a polyvalent salt of a long chain fatty acid containing 10 to 18 carbon atoms, the metal of said salt being selected from the group consisting of aluminum and zirconium; from 1 to 5% by weight of an insolubilizing and bonding agent of the group consisting of polyvinyl alcohol and hydroxyethyl cellulose; from 5 to 15% by weight of a hygroscopic material which functions as a humectant preventing dehydration of the solid composition of matter and consisting of an organic polyol compound having from 2 to 6 hydroxyl groups; and from 0.1% to 2% of sodium lauryl sulfate.

(References on following page)

References Cited in the file of this patent

UNITED STATES PATENTS

| | | |
|---|---|---|
| 1,722,928 | Lillenfeld | July 30, 1929 |
| 2,383,451 | Cothran | Aug. 28, 1945 |
| 2,426,300 | Edelstein | Aug. 26, 1947 |
| 2,456,595 | Rood | Dec. 14, 1948 |
| 2,577,840 | Burham | Dec. 11, 1951 |
| 2,635,055 | Figdor | Apr. 14, 1953 |

OTHER REFERENCES

"Spans & Tween," Atlas Powder Co., Wilmington, Delaware, 1942, pages 2 to 5.

Gloor et al.: "Ind. and Eng. Chem.," 42 2150–3, 1950.